(No Model.)

S. A. GOSS.
EXPANSION RUBBER BUCKET FOR CHAIN PUMPS.

No. 305,071. Patented Sept. 16, 1884.

Witnesses.
Will R. Omohundro.
Willie Rosniter.

Inventor:
Sanford A. Goss
By,
Louis P. Scoville
Atty.

United States Patent Office.

SANFORD A. GOSS, OF CHICAGO, ILLINOIS.

EXPANSION RUBBER BUCKET FOR CHAIN-PUMPS.

SPECIFICATION forming part of Letters Patent No. 305,071, dated September 16, 1884.

Application filed October 11, 1883. (No model.)

*To all whom it may concern:*

Be it known that I, SANFORD A. GOSS, a citizen of the United States, residing at the city of Chicago, in the county of Cook and State of Illinois, have invented a new and useful Improvement in Expansion Rubber Buckets for Chain-Pumps, of which the following is a specification.

My invention relates to improvements in expansion rubber buckets for chain-pumps, in which a bell-shaped rubber is placed upon a metallic link, and may be expanded by means of a nut or washer upon the lower part of the link; and the objects of my invention are, first, to prevent the bell-shaped rubber from slipping or turning upon the link; second, to prevent the nut or washer from becoming loosened, displaced, or turning upon its thread by striking against the reel of the pump in use. I attain these objects by mechanism illustrated in the accompanying drawings, in which—

Figure 1:
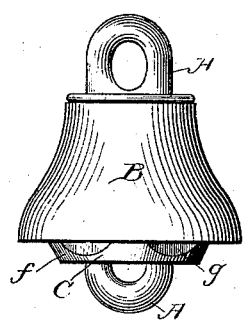
Figure 2:
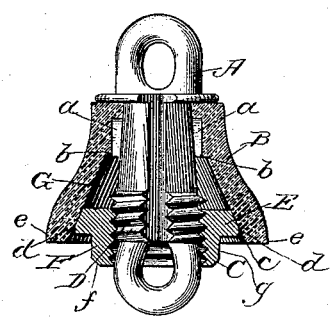
Figure 3:
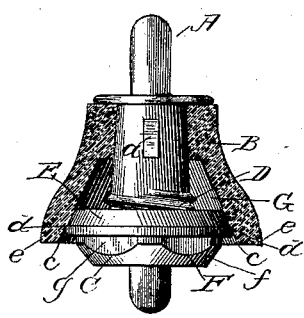
Figure 4:
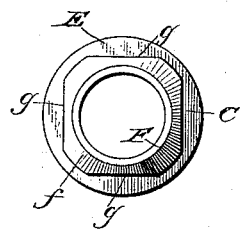

Figure 1 is a side elevation of the bucket. Fig. 2 is a vertical section of the bucket, except the link, of which a side elevation is shown. Fig. 3 is a vertical section of the bell-shaped rubber only, and a side elevation of the link and nut. Fig. 4 is an elevation of the lower face of the nut.

Similar letters refer to similar parts throughout the several views.

The link A, the bell-shaped rubber B, and the nut C constitute the bucket.

To prevent the bell-shaped rubber B from slipping or turning upon the link A, I have placed upon opposite sides of the link A two projections or nipples, $a\ a$, Figs. 2 and 3, which are made to fit or correspond to two indentations or slots, $b\ b$, Fig. 2, in the bell-shaped rubber B, so as to prevent the bell-shaped rubber B from slipping or turning upon the link A. This may be accomplished in other ways, as by means of any projection from the surface of the link A corresponding to a similar indentation in the bell-shaped rubber B; but I prefer to carry out this feature of my invention in the manner shown in Figs. 2 and 3.

To prevent the nut C from being loosened or displaced, or turning upon its thread D as the nut C strikes the reel of the pump in use, I have constructed a nut, C, Figs. 4 and 3, with its upper face, E, and its lower face, F, beveled. The upper face, E, of the nut being circular, and beveled to correspond to the concave surface G of the bell-shaped rubber B, the nut C being slightly smaller than the rim $c\ c$ of the bell-shaped rubber B, the rim $d\ d$ of the nut C does not touch the concave face G of the bell-shaped rubber B until the rim $d\ d$ of the nut C has passed beyond the rim $c\ c$ of the bell-shaped rubber B, allowing the rim $c\ c$ of the bell-shaped rubber B to extend slightly below the rim $d\ d$ of the nut C, producing an elastic bearing-edge, $e\ e$, upon the convex surface of the bell-shaped rubber B. The lower face, F, of the nut C, Fig. 4, is square, for the reception of the wrench; but is beveled in such a manner that, when the nut C is in place, Figs. 2 and 3, a smooth face, $f\ f$, is presented, and it is impossible for the square faces $g\ g$ of the nut C to strike against the reel of the pump in use, thereby avoiding all tendency upon the part of the nut C to become loosened, displaced, or turned upon the thread D by striking against the reel of the pump in use, thus securing by means of the combinations and improvements herein set forth a perfect expansion rubber bucket for chain-pumps, with an elastic bearing-edge, which will not become displaced or loosened through contact with the reel or other parts of the pump in use.

I am aware that prior to my invention expansion rubber buckets for chain-pumps have been made. I therefore do not claim such a combination, broadly; but What I do claim as my invention, and desire to secure by Letters Patent, is—

1. In combination, the link A, having projections $a$, the nut C, having beveled faces E and F, and the bell-shaped rubber B, having slots $b$, substantially as set forth.

2. In combination, the link A, having projections $a$, the nut C, having beveled faces E and F and squared portions $g$, and the bell-shaped rubber B, having slots $b$, substantially as set forth.

SANFORD A. GOSS.

Witnesses:
 LOUIS P. SCOVILLE,
 EDWARD C. WALKER.